United States Patent [19]

Born

[11] 4,223,938
[45] Sep. 23, 1980

[54] MOBILE SHOWROOM WITH LIVING QUARTERS

[76] Inventor: Raymond W. Born, 4211 First Street, Space 121, Santa Ana, Calif. 92703

[21] Appl. No.: 945,591

[22] Filed: Sep. 25, 1978

[51] Int. Cl.² .............................................. B60P 3/36
[52] U.S. Cl. ...................................... 296/21; 296/162
[58] Field of Search .................. 296/1 R, 21, 156, 162

[56] References Cited

U.S. PATENT DOCUMENTS

| | | | |
|---|---|---|---|
| 1,327,248 | 1/1920 | Moody | 296/21 |
| 1,895,228 | 1/1933 | Mennillo | 296/21 |
| 3,338,622 | 8/1967 | Bachmann | 296/65 R |

Primary Examiner—John J. Love
Assistant Examiner—Ross Weaver
Attorney, Agent, or Firm—Sellers & Brace

[57] ABSTRACT

A motor coach the major portion of the interior which comprises businessman's conference and sales promotion room occupying the rear end of the coach and much of its length and the remainder of which includes living facilities for the driver. The rear end of the coach comprises transparent panels one of which slides to provide an entrance. A protective device covers the exterior of these panels when the display room is not in use and shifts to a horizontal position at other times to provide an access for the entrance.

3 Claims, 3 Drawing Figures

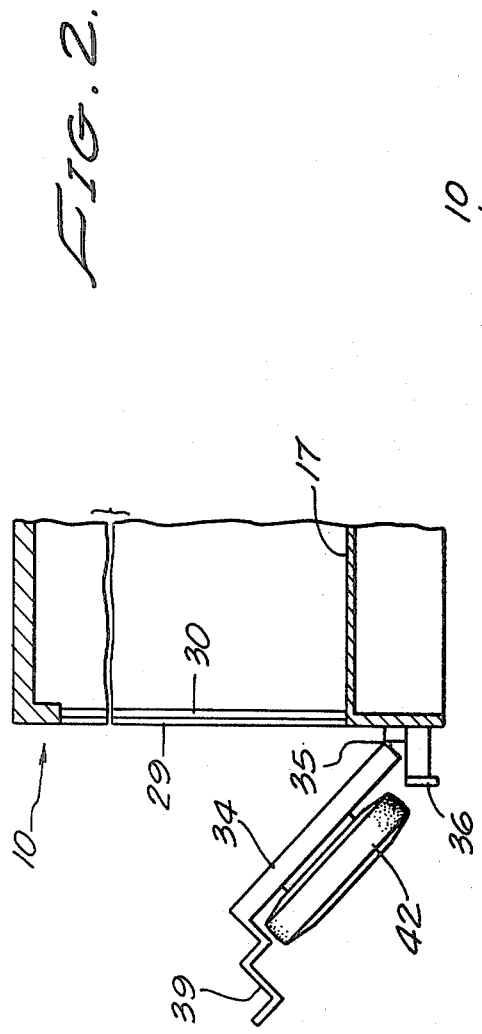
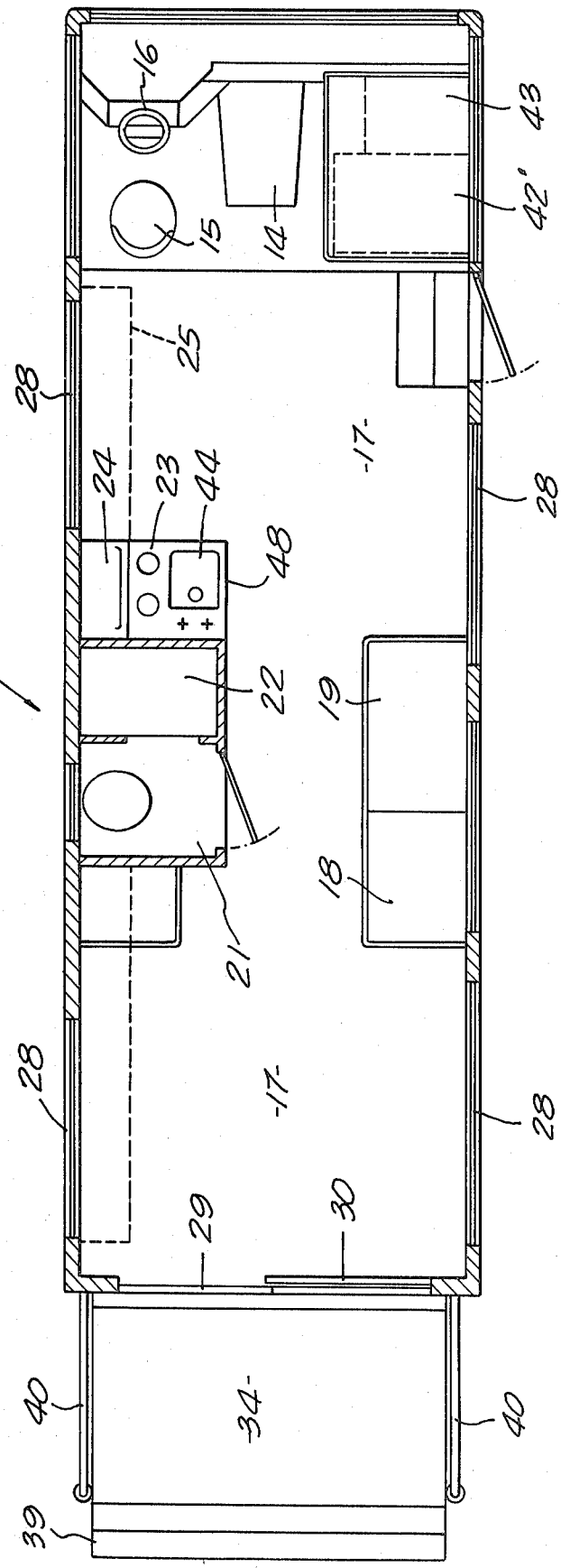

MOBILE SHOWROOM WITH LIVING QUARTERS

This invention relates to motor coaches, and more particularly to a novel coach design having minimum living quarter provisions for the coach driver and maximum provision for the business conferences and display and promotion or merchandise, new products and the like.

Provided by this invention is a unique motor coach specially designed for use by business men, sales executives and promotional people having need for making presentations of concepts, new products, and specialized services utilizing facilities and equipment readily transported directly to the location of interested persons whether in rural or urban settings at low cost, maximum convenience and minimum risk and hazards. The coach embodies numerous unique features satisfying these needs and objectives and includes essential but minimum living facilities for the coach operator and person making the presentation. Substantially all portions of the coach floor are on the same level and extend from wall to wall and the length of the coach rearwardly of the driver station. The rear end wall of the display room is formed by transparent panels one of which is slidable into a retracted position providing an entranceway. When the display room is not in use the panels are protected by a protector hinged to the coach body and serving additionally as a porch and stairway when lowered as well as a support for one or more spare tires. The entire length of the coach is open to provide commodious accommodations for clients witnessing a presentation. The display room can be equipped with movie, video and television equipment, as well as with telephone facilities.

Accordingly, it is a primary object of this invention to provide a unique, mobile showroom with living quarters for the operator.

Another object of the invention is the provision of a mobile showroom having living quarters for the vehicle driver and the rear end of which is closed by transparent panels one of which is usable as an extranceway adjacent a combination folding stairway and protector for the panels.

Another object of the invention is the provision of a mobile conference and showroom having a floor interiorly thereof extending substantially from end-to-end and wall-to-wall and having a glass paneled rear end serving as an entranceway.

These and other more specific objects will appear upon reading the following specification and claims and upon considering in connection therewith the attached drawing to which they relate.

Referring now to the drawing in which a preferred embodiment of the invention is illustrated:

FIG. 2 is a fragmentary cross-sectional view on a reduced scale of the rear end portion of the display room with the combination entranceway and panal protector partially open; and FIG. 3 is a transverse cross-sectional view of FIG. 1 taken inwardly of the coach roof.

Figure 1:
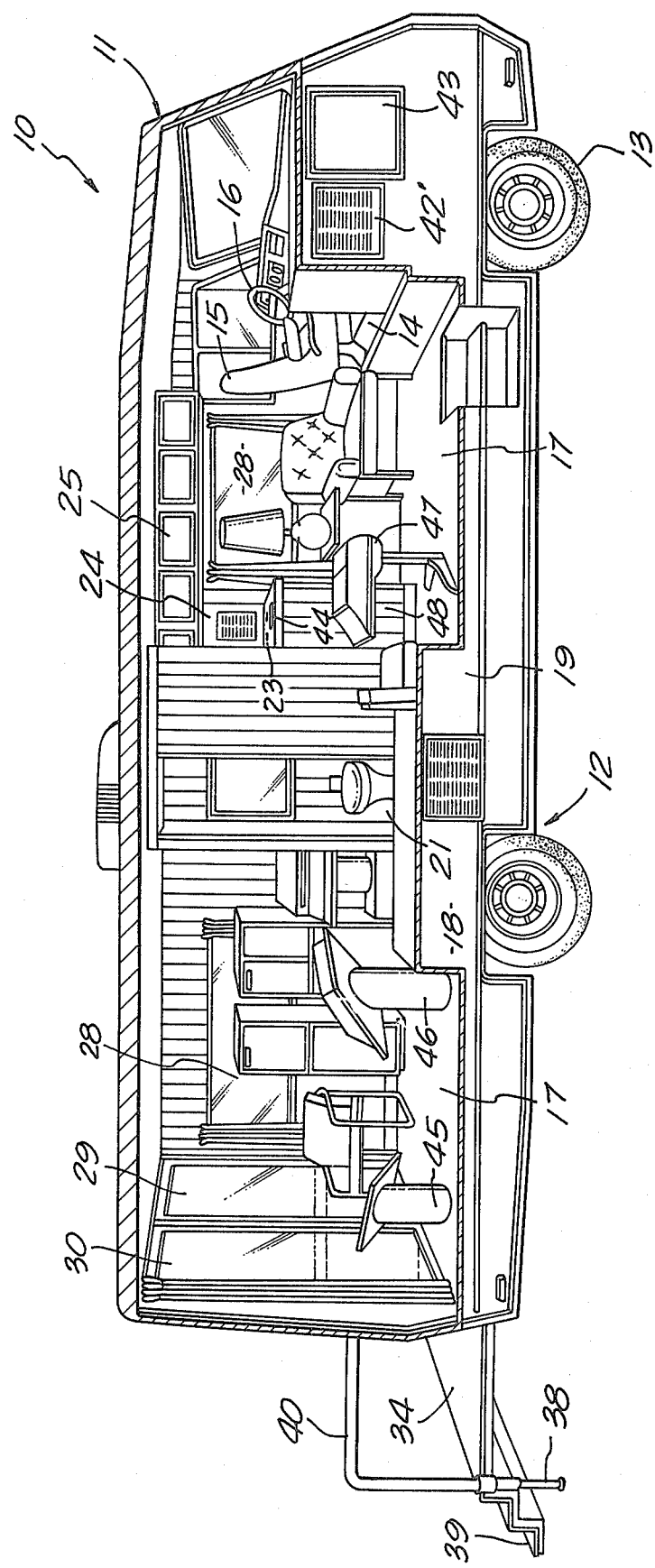
FIG. 1 is a longitudinal cross-sectional view of a motor coach taken just inside the near sidewall and showing the rear entranceway in its extended position.

Referring more particularly to FIGS. 1 and 2, there is shown an illustrative embodiment of the inventor motor coach, designated generally 10, comprising an enclosure 11 mounted on a chassis 12 having steerable forward wheels 13 and powered by an engine, not shown, but located below access hood 14 in the driver's compartment. The driver's compartment is provided with a seat 15 swivelly supported on a pedestal behind the vehicle steering wheel 16. Seat 15 can be locked in a forwardly facing position when in use for vehicle piloting purposes but, at other times, the lock, not shown, can be released thereby permitting the chair to pivot rearwardly.

It will be understood that substantially the entire interior of the coach rearward of the driver's compartment is provided with a level floor 17 extending from end-to-end and wall-to-wall of the interior of the coach except for the portions overlying the rear wheels. This latter area on the right hand side as viewed in FIG. 3 is occupied by a low level water storage tank 18 and forwardly of that tank is a compartment 19 having a power generator suitable for driving various auxiliaries and any electrical equipment required in connection with the use of the display room. The space overlying the wheel well on the left hand side of the coach may be utilized as an extra seat, a low table or the like.

Built in living accommodations adequate for the coach driver include a bathroom 21 and a shower 22. Forwardly of the shower are cooking facilities including a range 23, an overhead microwave oven 24, and a sink 44 overlying a refrigerator 48. Forwardly of the kitchen is a group of overhead storage compartments 25. Overlying the coach front wheel is a furnace 42 and a water heater 43.

Both sides of the coach are provided with large picture-type windows 28. Substantially the entire rear end of the coach and display room is closed by large glass panels 29, 30 one of which, as 30, is slidably supported. These panels extend from the floor to the ceiling and when panel 30 is open, it serves as an entranceway to and from the display room occupying the major portion of the coach interior. An important feature is the provision of a combination protective shield and folding entranceway 34 for panels 29, 30. This entranceway is hinged at 35 to the rear end of the chassis and in its extended or lowered position, it rests in part against the support for the coach bumper 36 and in part on legs 38. One or more steps 39 are attached to protector 34 and tubular railings 40, 40 and legs 38 are socketed in suitable fittings attached to the protector 34 and to the rear end of the coach. The rearwardly facing face of protector 34 is provided with suitable means for carrying one or more spare tires 42 for the coach. Any suitable fastener devices such as thumb screws or the like, not shown, may be used to lock the protector 34 retracted against the rear end of the coach when in a travel mode.

As is clearly evident from FIGS. 1 and 3 and, the latter in particular, all except a very minor portion of the coach interior occupied by the bath and kitchen facilities is unobstructed, free of transverse partitions and available for use as a display room for equipment, new products, charts and the like or for the display of video tapes, movie film, etc. FIG. 1 includes by way of example, a number of stands 45,46,47 for charts and visual material of assorted types. Actual physical embodiments of various products may be demonstrated in operation utilizing power supplied by generator 19. Although not shown, it will be understood that radio public telephone equipment may be included enabling the coach operator or guests temporarily absent from their nearby offices to receive and return telephone calls without leaving the coach.

It will be recognized from the foregoing description that the present invention provides a unique mobile coach having exceptionally large fully open non-partitioned display room facilities having all portions of its floor on a common level. This large space is readily outfitted for maximum convenience and effectiveness in displaying a particular product by equipment appropriately constructed for that purpose. The coach so equipped is then driven to a location most convenient for the prospective viewer. The presentation can be made without need for inconveniencing the prospect or requiring any space, auxiliaries or the like from the prospective client or customer. On the contrary the prospects merely step from their own office facilities into the motor coach display room. After the demonstration, the coach is in readiness to proceed to the next demonstration immediately following retraction of the combination protector and entranceway 34.

While the particular mobile showroom with living quarters herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

I claim:

1. In combination, a mobile businessman's conference room; comprising;

a self-propelled motor coach having an elongated main body provided with non-transparent sidewalls having windows restricted to the upper portion thereof and a plurality of transparent panels crosswise of the end thereof one of which is a movably supported door for the passage therethrough of patrons of said conference room;

said coach having living accessories confined to one forward sidewall thereof including cooking facilities and an enclosed non-transparent bathroom;

the interior of said conference room being free and unobstructed by transverse partitions intermediate the opposite ends thereof and having a uni-level floor extending from a driver's station at the forward end thereof to said rear transparent panels thereby providing a businessman's conference room occupying the major portion of the length and breadth of said coach; and a combined protective shield for the transparent panels across and exteriorly of the rear of said conference room and an entranceway for patrons of said conference room, said combined shield and entranceway being pivotally supported crosswise of the rear end of said conference room and pivotable between a retracted upright protective position closely beside the exterior of said rear transparent panels and an extended generally horizontal position crosswise of and adjacent the level of the lower end thereof for the passage thereover of patrons entering and leaving said conference room.

2. The combination defined in claim 1 characterized in that said pivotally supported combined protective shield and entranceway includes spare tire carrying means on the exterior face thereof when the same is folded to an upright panel shielding position.

3. The combination defined in claim 2 characterized in that said combined protective shield and entranceway includes steps along one edge thereof extending toward ground level when said protective shield and entranceway is in the horizontal non-travel mode thereof.

* * * * *